United States Patent [19]

Romick

[11] Patent Number: 5,109,984

[45] Date of Patent: May 5, 1992

[54] UNIT-DOSE MEDICATION HANDLING AND DISPENSING SYSTEM

[76] Inventor: Jerome M. Romick, 170 N. Drexel Ave., Columbus, Ohio 43209

[21] Appl. No.: 542,269

[22] Filed: Jun. 22, 1990

[51] Int. Cl.5 .......................................... B65D 83/04
[52] U.S. Cl. .................................. 206/531; 206/532; 206/534; 206/538; 206/539; 206/459
[58] Field of Search ............. 206/531, 532, 536, 538, 206/539, 534, 459, 232; 221/25, 64, 69, 87, 89

[56] References Cited

U.S. PATENT DOCUMENTS

| | | |
|---|---|---|
| 364,623 | 6/1987 | Beidler . |
| 1,217,243 | 2/1917 | Tucker et al. ................. 206/459 |
| 1,492,101 | 4/1924 | Mordecai . |
| 2,108,492 | 2/1938 | Lagier ......................... 206/232 |
| 2,551,138 | 5/1951 | Kirkland ...................... 206/232 |
| 2,789,689 | 4/1957 | Lewis .......................... 206/459 |
| 2,822,082 | 2/1958 | Breckwoldt et al. ........... 206/232 |
| 3,111,220 | 11/1963 | Bostrom . |
| 3,143,207 | 8/1964 | Wagner ........................ 221/89 |
| 3,199,489 | 8/1965 | Ruoss et al. . |
| 3,294,222 | 12/1966 | Hodgson . |
| 3,302,775 | 2/1967 | Finkelston, Jr. et al. . |
| 3,324,995 | 6/1967 | Sharp, Jr. . |
| 3,324,996 | 6/1967 | Jordt .......................... 206/531 |
| 3,327,843 | 6/1967 | O'Meara et al. . |
| 3,387,699 | 6/1968 | Heller . |
| 3,397,671 | 8/1968 | Hartman, Jr. et al. .......... 206/539 |
| 3,494,322 | 2/1970 | Dubbels . |
| 3,504,788 | 4/1970 | Gray .......................... 206/531 |
| 3,527,190 | 9/1970 | Huck . |
| 3,556,388 | 1/1971 | Klein . |
| 3,567,013 | 3/1971 | Tannenbaum ................. 206/538 |
| 3,579,883 | 5/1971 | Hayes . |
| 3,630,171 | 12/1971 | Huck ........................... 206/539 |
| 3,659,706 | 5/1972 | Serrell . |
| 3,756,384 | 9/1973 | Stone . |
| 3,826,222 | 7/1974 | Romick ........................ 206/534 |
| 3,844,408 | 10/1974 | Relyea . |
| 3,856,144 | 12/1974 | Kelly . |
| 3,921,804 | 11/1975 | Tester . |
| 3,958,690 | 5/1976 | Gee, Sr. . |
| 4,074,806 | 2/1978 | Ardito . |
| 4,169,531 | 10/1979 | Wood ........................... 206/532 |
| 4,189,053 | 2/1980 | Stagnitto et al. . |
| 4,211,329 | 7/1980 | Braverman . |
| 4,254,871 | 3/1981 | Poore . |
| 4,384,649 | 5/1983 | Brodsky ........................ 206/532 |
| 4,429,792 | 2/1984 | Machbitz . |
| 4,485,915 | 12/1984 | Berghahn . |
| 4,511,032 | 4/1985 | Bush ........................... 206/531 |
| 4,593,819 | 6/1986 | Will . |
| 4,664,262 | 5/1987 | White . |
| 4,667,845 | 5/1987 | Frazier et al. ................. 221/25 |
| 4,693,371 | 9/1987 | Malpass ....................... 206/538 |
| 4,706,815 | 11/1987 | Curtis . |
| 4,735,318 | 4/1988 | Keffeler . |
| 4,741,441 | 5/1988 | Keffeler . |
| 4,817,819 | 4/1989 | Kelly ........................... 206/531 |
| 4,905,866 | 3/1990 | Bartell ......................... 206/539 |
| 4,955,481 | 9/1990 | Novinski et al. ............... 206/534 |
| 4,974,729 | 12/1990 | Steinnagel .................... 206/232 |
| 4,998,623 | 3/1991 | Doull .......................... 206/232 |

FOREIGN PATENT DOCUMENTS 300648 11/1954 Switzerland ................. 206/539

*Primary Examiner*—David T. Fidei
*Attorney, Agent, or Firm*—Wood, Herron & Evans

[57] ABSTRACT

This patent discloses reusable, plastic medication dispensing containers for dispensing medication from a blister pack. The container includes a top, bottom, and retaining frame that are molded from a one-piece plastic and hingeably connected one to the other.

5 Claims, 1 Drawing Sheet

UNIT-DOSE MEDICATION HANDLING AND DISPENSING SYSTEM

BACKGROUND OF THE INVENTION

In my prior U.S. Pat. No. 3,826,222 there is disclosed a system for handling and dispensing prepackaged unit doses of medicine for a large number of patients, typically long-term nursing home patients. The system, successfully commercialized under the trademark ArtroPak, includes a dispensing box or container that is packed with unit dose medication. The box has printed on its exterior color coded sections to indicate various times and other conditions of administering the unit doses. A label, usually multi-part, printed with indicia relative to the patent is provided for superimposing on the color coded area of the container. By selectively punching the label before it is affixed to the container the color coded sections on the container are exposed when the label is affixed to the container. The exposed coded sections are readily visible to the person dispensing the medication and these color coded indicia signal to the person the time or conditions of administering the medication. Charting records are also provided to indicate the time and conditions of dispensing. The medication dispensing system of my '222 patent is one which is not reusable.

The prior art is replete with reusable medication dispensing containers which receive thermoformed blister packs. These devices suffer from one or more disadvantages: some are expensive to manufacture, others are complicated to use, others use multiple parts which may become lost in use, and many are cumbersome or difficult to use. Many do not make provision for quickly and easily changing medication prescription information.

Based upon these and other considerations it has been the principle objectives of this invention:

1. to provide a reusable medication dispensing container for receiving thermoformed blister packs which may be cheaply manufactured;
2. to provide such a system which contains a top, bottom, and retaining frame molded from a one piece plastic where these elements are hingeably attached;
3. to provide such a system which provides means to retain a prescription label within the top of the medication dispensing container in such a manner so that information is viewable through the top when the top is in its closed position;
4. to provide such a container which is color coded for ease of dispensing medication in long term care nursing facilities;
5. to provide such a container where the top stands vertically when opened so that the patient information recorded on the label on the inside of the top may be easily viewed by the nurse; and,
6. to provide such a container which will fit within the palm of one's hand and which may be quickly and easily opened and closed.

DETAILED DESCRIPTION OF THE INVENTION

Figure 1:
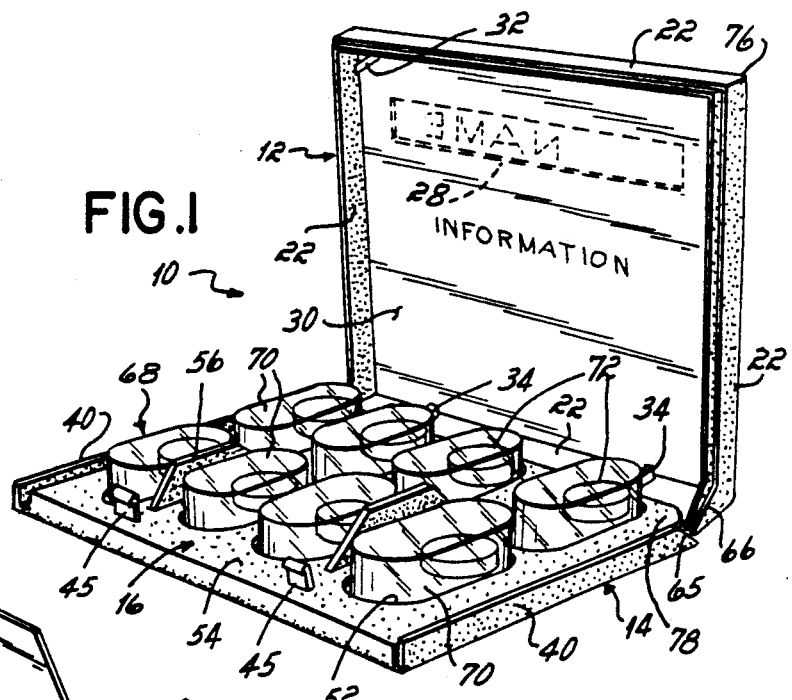
FIG. 1 is a perspective view showing the medication container of the present invention with the lid open and standing in a vertical position.

The reusable medication dispensing container 10 of the present invention is injection molded as a one piece structure from polypropylene and comprises three elements, a top 12, a bottom 14 and a blister pack retaining frame 16. These are joined together by hinges 18 and 20.

Top 12 includes four walls 22, an exterior surface 24 and an interior surface 26. An aperture 28 permits at least a portion of one side of a label 30, described below, to be viewed from the exterior when positioned on the interior surface 26. The portion of the label 30 that is visible through the top 12 can be printed with the patients name.

Means are provided in the form of two diagonal straps 32 and two projections 34 formed in a wall 22 and terminating short of the surface 26 to hold the label 30 in position against the interior surface 26 of the top 12. Other means could be used including a pressure-sensitive adhesive on the label 30 as well as four straps 32 or four posts 34 on opposite walls 22. Whatever means are provided should be constructed so as to permit easy insertion and removal of the label 30. When the label 30 is affixed it will contain the information normally printed on a medication dispensing label. This information is on the side of the label 30 which is visible only when the top 12 is opened.

The top 12 includes two raised portions 36 with grooves 38 which cooperate with means on the bottom 14, described below, to hold the bottom 14 and top 12 together when the container 10 is closed.

The bottom 14 has two side walls 40 and a plurality of apertures 42 arranged in two rows of four. Two locking posts 44 are integrally molded into the bottom 14 and serve to hold the retaining frame 16 in place. Each post 44 has at its top 46 a sloped portion 48 that is angled. Below the sloped portion 48 is an indented portion 50. Similar locking posts 45 serve to engage the grooves 38 to secure the top 12 to the bottom.

The retaining frame 16 includes apertures 52, arranged in two rows of four. When the frame is in the closed position, the apertures 52 align with apertures 42 in the bottom 14. On the front surface 54 are two ribs 56 which serve to help maintain the label 30 in position when the container 10 is closed. On the free end 58 are two indentations 60 which receive the locking posts 44 and to secure the retaining frame 16 to the bottom 14. On the back surface 62 are thickening ribs 64.

As noted above, hinges 18 and 20 serve to join the top 12, bottom 14, and retaining frame 16 in hinged relationship. This permits top 12 to be moved away from the frame 16 and bottom 14 and also permits frame 16 to be moved away from bottom 14.

Figure 2:
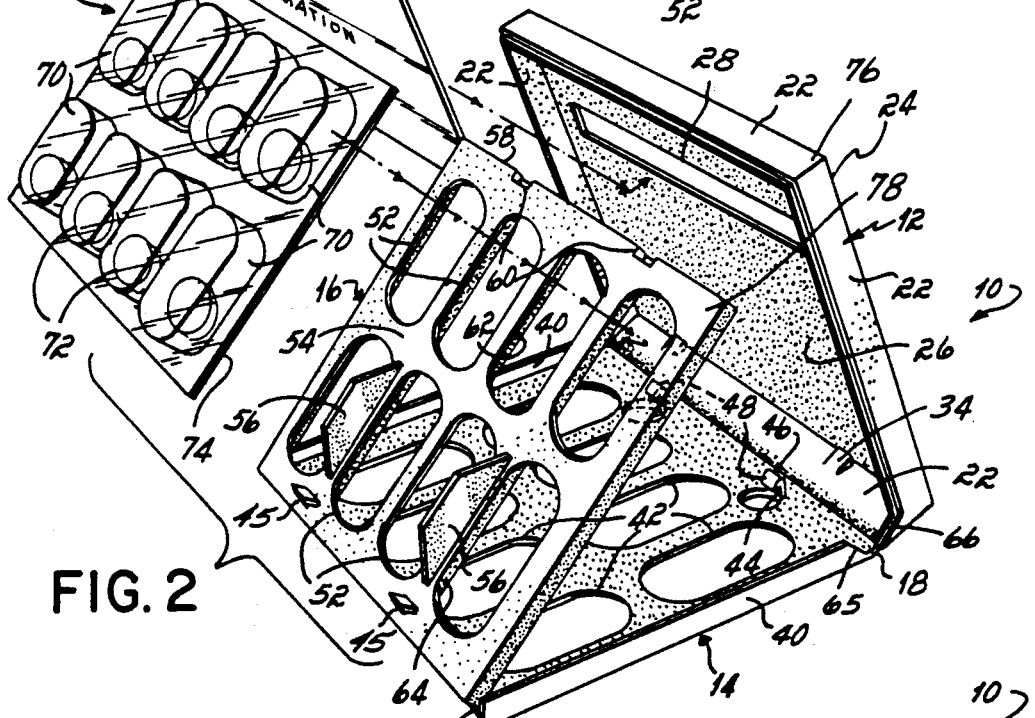
FIG. 2 is an exploded perspective view showing the blister pack and patient label in a position before their insertion into the container.

Referring to FIG. 2, it will be noted that where side 40 of the bottom 14 and side 22 of top 12 meet they are angled at 65 and 66. This is done so that the top 12 is vertically positioned, as in FIG. 1, when the top 12 is opened.

The medication to be contained in the reusable container 10 is packaged in a blister pack 68 with pill chambers 70 which is thermoformed from any suitable plastic. After pills 72 are positioned in the chambers 70 a metal foil layer 74 with adhesive thereon is heat sealed to the blister pack 68. The blister pack 68 is sized such that the pill chambers 70 can fit within the apertures 52 of the medication retaining frame 16.

As shown in FIGS. 1 and 2, when the frame 16 is in its locked position it is within the confines of side walls 40 of the bottom 14. When the top 12 is closed and locked, two of its side walls 22 rest on the two side walls 40 of the bottom 14.

After the blister pack 68 is filled with pills 72 it is placed on the bottom 14 of the reusable container 10 with its metal foil layer 74 against the bottom 14. The medication dispensing frame 16 is folded over the blister pack 68 and latched into place by the locking posts 44 and indentations 60.

An information label 30 with patient information on each side is positioned within the top 12 by inserting the two corners within the straps 32 and holding the bottom edge by the posts 34 The top 12 may then be closed and latched by the posts 45 engaging the grooves 38. When closed, the information on the label 30, as for example the patients name, may be viewed through the aperture 28.

Figure 3:
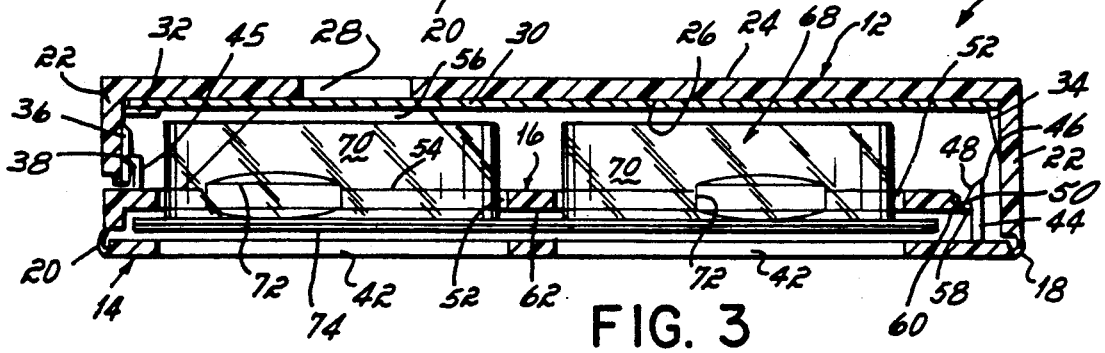
FIG. 3 is a cross-section of the container in its closed position with the medication contained in it.

The reusable container 10 is shown in its closed position in FIG. 3. To open it one lifts upwardly on one corner 76 of the top 12. Pushing downwardly on a pill 72 causes it to rupture the foil 74 and exit the blister pack 68 through an aperture 42 in the bottom 14.

After the entire supply of medication is used the container 10 may be reused by lifting up one edge 78 of the frame 16 to unlock it, removing the used blister pack 68, and inserting a new one. Label 30 is also replaced.

Where the container 10 of the present invention is used in long-term nursing facilities where patients receive multiple dosages of several different medications, it is desirable to color code the container so that one color signifies an a.m. dispensing time, another a p.m. dispensing time, another a noon dispensing time, and so forth. For ease of reference these times may also be imprinted on the container itself. Small bins, not shown, that fit within medication carts, not shown, can be used to contain a plurality of containers 10 with one bin being used for each patient.

Having thus described my invention I claim:

1. A reusable, plastic medication dispensing container, comprising:
    a top, bottom, and unit-dose medication retaining frame, being molded as a one piece structure, with said top and frame being hingeably attached to said bottom;
    reuseable means for affixing a label with patient medication information to said top, with said label affixing means being molded as an integral part of said top;
    a hole through said top for viewing a portion of a label so affixed;
    reuseable means, integrally molded to said top, bottom and frame, for interlocking said frame to said bottom and said top to said frame by positive mechanical locking action; and
    a plurality of matching apertures through said bottom and frame,
    whereby a blister pack can be sandwiched and locked between said bottom and frame, and unit-dose medication from such a sandwiched blister pack can be passed through the apertures in said bottom, and said top can be interlocked directly above said frame.

2. The container of claim 1 further comprising:
    means for forcing a label, so affixed to said top, firmly against said top when said top and frame are interlocked, wherein said forcing means makes such a non-permanently affixed label more closely appear and behave as if it were permanently attached to said top.

3. A reuseable, plastic medication dispensing container, comprising:
    a rectangular top, bottom and unit-dose medication retaining frame each having a front and back surface and a plurality of edges, with said top, bottom and frame being molded as a one piece unit, and said top and frame being hingeably attached to said bottom along adjoining edges;
    a plurality of posts and diagonal straps located adjacent to and integrally connected to the back surface of said top, whereby a label can be proximately affixed to the back surface of said top by the use of said posts and straps;
    a hole through said top for viewing a portion of a label so affixed;
    at least one first locking post located adjacent to an edge of and projecting out of the front surface of said bottom and having a detent, wherein the first detent is engageable with an indentation located along a corresponding edge of said frame;
    a plurality of matching apertures through said bottom and frame, whereby a blister pack can be sandwiched and locked between said bottom and frame when said first locking post and indentation are engaged, and unit-dose medication from such a sandwiched blister pack can be passed through the apertures in said bottom;
    at least one second locking post located adjacent to an edge of and projecting out of the front surface of said frame and having a detent, wherein the second detent is engageable with a groove located adjacent to a corresponding edge of said top, whereby said top is interlocked with and directly above said frame when said second locking post and groove are engaged.

4. The container of claim 3 further comprising at least one rib located on and projecting out from the front surface of said frame, whereby said rib forces a label, affixed to said top by said straps and posts, firmly against the back surface of said top when said top and frame are interlocked.

5. The container of claim 3 wherein each day of the week is noted on the front surface of and located adjacent to a frame aperture.

* * * * *